United States Patent [19]

Zakhariya

[11] 4,147,157

[45] Apr. 3, 1979

[54] SELF-SUPPORTING ACTIVE SOLAR ENERGY SYSTEM

[76] Inventor: Ramiz H. Zakhariya, 2400 McBride La., #50, Santa Rosa, Calif. 95401

[21] Appl. No.: 800,413

[22] Filed: May 25, 1977

[51] Int. Cl.² ............................................. F24J 3/02
[52] U.S. Cl. .................................. 126/271; 136/89 P; 237/1 A
[58] Field of Search ............... 136/89 P, 89 R; 126/270, 271; 237/1 A

[56] References Cited

U.S. PATENT DOCUMENTS

| | | | |
|---|---|---|---|
| 1,849,266 | 3/1932 | Bentz | 126/271 |
| 3,974,822 | 8/1976 | Patil | 126/271 |
| 4,026,267 | 5/1977 | Coleman | 126/271 |

Primary Examiner—John J. Camby
Assistant Examiner—Larry I. Schwartz
Attorney, Agent, or Firm—Melvin R. Stidham

[57] ABSTRACT

An active solar energy system comprising an array of solar collectors, a pumping device to circulate fluid therethrough and a storage tank to contain the heated fluid. The pump is driven by an electric motor and a solar-electric power transducer system energizes the motor, whereby the fluid is circulated through the collector system whenever sunlight is available. The heated fluid from the collector array, as well as the unheated fluid from the source are delivered to a mixing vessel from which the mixture fluid is delivered to a storage tank to meet demands.

2 Claims, 1 Drawing Figure

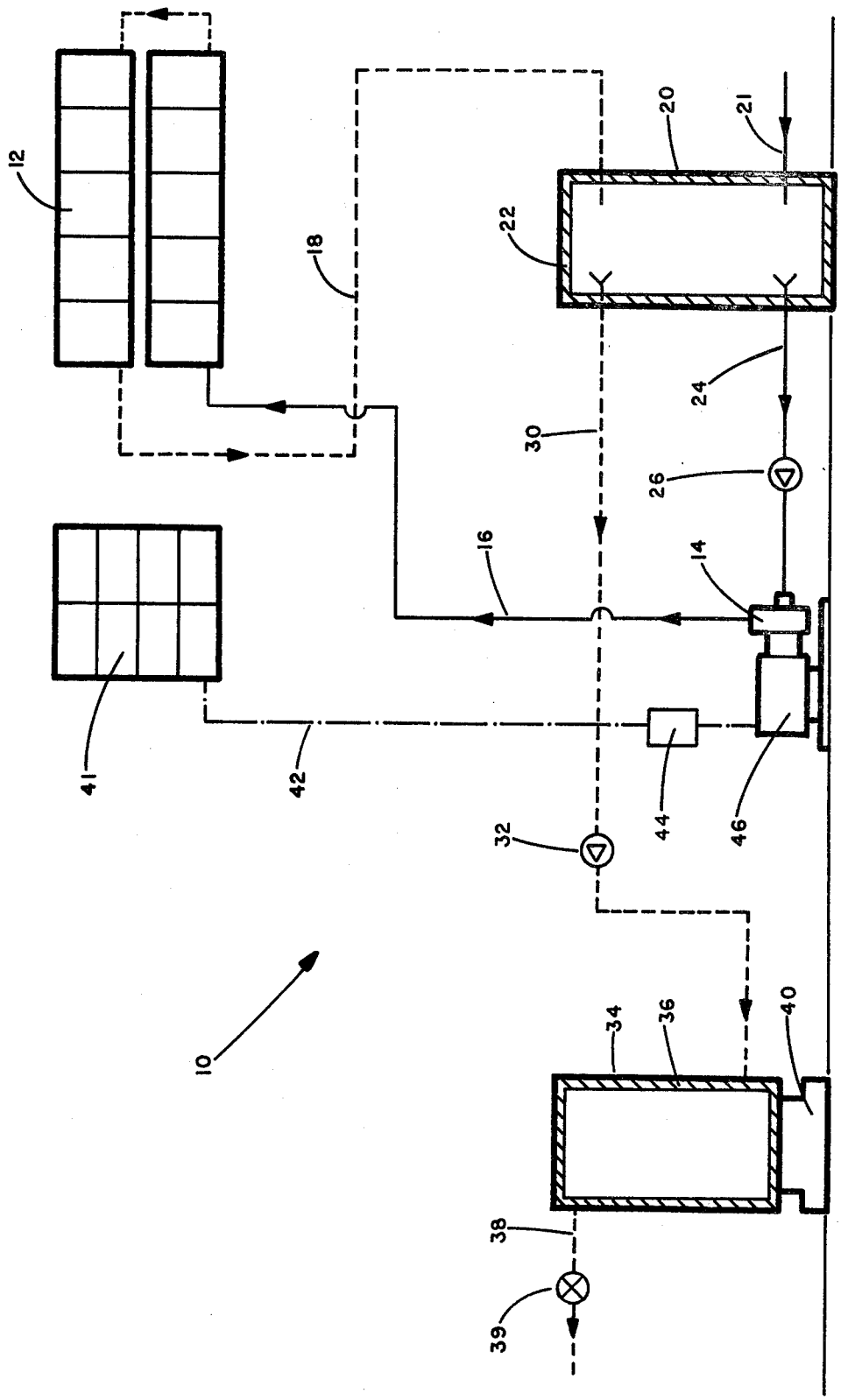

SELF-SUPPORTING ACTIVE SOLAR ENERGY SYSTEM

BACKGROUND OF THE INVENTION

In active solar energy systems presently available, a fluid is circulated through solar collectors by some mechanical means using conventional sources of energy, such as commercial electricity for energizing motor driven pumps. Such systems generally include electric and electronic control devices which are relatively expensive and also depend upon utility power for their energy requirements, thereby increasing the cost of operation as well as that of acquisition.

OBJECTS OF THE INVENTION

It is an object of this invention to provide an active solar energy system which is not dependent upon the purchase of energy for operation.

It is a further object of this invention to provide a solar energy system which is relatively inexpensive to install and which may be operated at little or no cost.

Further objects and advantages of this invention will become apparent from the description to follow, particularly when read in conjunction with the accompanying drawing.

SUMMARY OF THE INVENTION

In carrying out this invention, I provide an array of solar collectors through which a fluid, either liquid or gas, is circulated. In the case of water, for example, as a medium, it is delivered to the system from a utility water line to be pumped through the array of solar collectors and into a mixing vessel where it mixes with, and preheats the source fluid. From the mixing vessel the fluid is passed to a storage tank or tanks from which it is drawn off as needed. The pump is driven by an electric motor which is energized from an array of photovoltaic panels or solar-power transducers so that, when sun is available, the circulation of the fluid through the collector panels is continual without reliance upon an external electrical source. When there is no demand, the circulation through the collector array continues to elevate the temperature in the mixing vessel which should be of adequate capacity to handle demands. The solar heating capacity may be supplemented by a thermostatically controlled heater at one or more storage tanks.

BRIEF DESCRIPTION OF THE DRAWING

The drawing is a schematic illustration of a self-supporting active solar energy system embodying features of this invention.

DESCRIPTION OF A PREFERRED EMBODIMENT

Referring to the drawing with greater particularity, the self-supporting active solar energy system 10 of the invention includes an array of solar heat collectors 12, of a size and quantity depending upon the heat requirements of the system. A suitable fluid, either liquid or gas, is delivered by a pumping device 14 through thermally insulated conduit 16 to the solar heat collector array 12 from which they are delivered through a thermally insulated conduit 18 to a mixer vessel or tank 20, where it is mixed with and preheats fluid from inlet line 21 from a suitable source, such as a utility water line when water is the medium. The mixer vessel not only preheats inlet fluid, but functions as an expansion accommodation chamber, a storage tank and a distribution center for circulation of fluid through lines 24 and 30 from lines 18 and 21. Further, with modification it could function as a heat exchanger when a non-freezing liquid is circulated through the solar collectors 12.

The mixer vessel is also thermally insulated at 22 to maintain a level of heat achieved. Colder fluid from the mixer tank is drawn by the pump 14 through a thermally insulated conduit 24, with a suitable one-way valve 26 therein to prevent backflow.

The warmer fluid is forced from the mixer tank 20 through thermally insulated conduit 30 and one-way valve 32 to one or more suitable storage tanks 34, also thermally insulated at 36. The fluid as needed for consumption is drawn off through thermally insulated duct 38 by operation of suitable valve means 39, such as a water tap when water is the medium.

If desired, the system may be supplemented with a thermostatically controlled heater 40 on one or more of the storage tanks.

Photovoltaic panels or solar-electric transducer 41 in size and number depending upon the capacity and output of the system 10, generate electricity on solar exposure which is conducted at 42 through associated circuitary 44, if required, to a motor 46 which drives the pump 14. Hence, when sun is available, the motor 46 is energized and pump 14 circulates fluid through the solar panels 12 to the mixer tank 20 with the colder fluid from the input line 21 being drawn to the pump. The pressure of fluid in the source system 21 is sufficient to force fluid from the mixer vessel 20 through the line 30 to the storage tanks 34.

The operation of this system 10 may be described as follows:

When sun is available and heated fluid is in demand, the photovoltaic panels will energize the motor 46 to drive the pump 14 and circulate fluid through the collector panels 12, whereby the heated fluid will be mixed to preheat water in the mixer vessel from the source 21, and is then passed to the storage tanks 34 and out through lines 38 to meet the demand.

When sun is not available and fluid is in demand, the motor 46 is inactive and, hence, there is no flow through the solar collectors 12. Only the fluid existing in the mixer vessel 20 and the main storage tank 34 is heated for use, and it could occur that unheated fluid is eventually delivered to the storage tanks 34. In this case, the thermostatically controlled heater 40 would be activated to raise the temperature of the fluid in the storage tanks when the temperature of the fluid has dropped below the setting of the thermostat.

When the sun is available and there is no demand, the motor 46 will be energized and continue to pump fluid through the solar collector panels 12 to the mixing vessel 20 where it will remain in absence of a demand. In this case, the continued flow through the solar collector panels 12 will elevate the temperature of the fluid in the mixing vessel up to their own level.

When the sun is not available and there is no demand the system simply remains dormant.

While this invention has been described in conjunction with a preferred embodiment thereof, it is obvious that modifications and changes therein may be made by those skilled in the art without departing from the spirit and scope of this invention, as defined by the claims appended hereto.

What I claim as invention is:

1. In an active solar energy system comprising:
an array of solar collectors;
intake and transfer fluid ducts connected to said collector array;
a source of fluid;
a pumping device in said intake duct;
an inlet line for delivering a fluid from the source thereof to said pumping device;
an electric motor conditioned to drive said pumping device; and
a storage tank;
said transfer duct being adapted to conduct fluid to said storage tank;
the improvement comprising;
a solar-electric power transducer system exposed to sunlight when available;
said transducer system including solar-electric transducers in size and number to generate electricity sufficient to energize and drive said motor;
electric conductors connected to deliver an electric current from said power transducers system to said motor; and
a mixer vessel connected into said transfer duct and said inlet line upstream of said pumping device, whereby fluid from said collector array and said source will be mixed.

2. The solar energy system defined by claim 1 including;
a thermostat controlled heater to heat fluid in said storage tank; and
a delivery duct opening from said storage tank.

* * * * *